Feb. 20, 1962 KEIZO SHIMANO 3,021,728
THREE STAGE SPEED CHANGE MECHANISM FOR A BICYCLE
Filed July 21, 1959
2 Sheets-Sheet 1
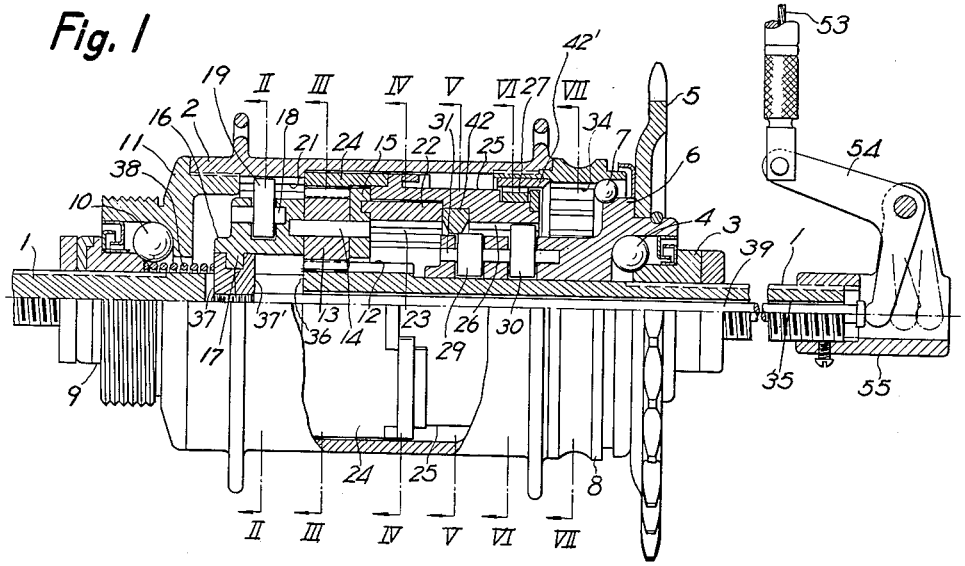
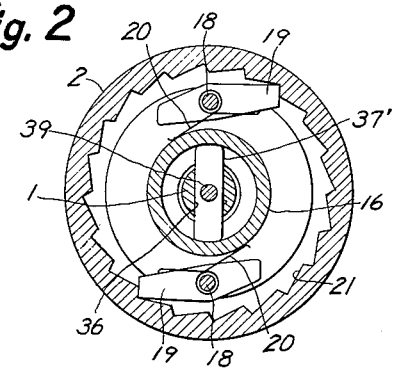
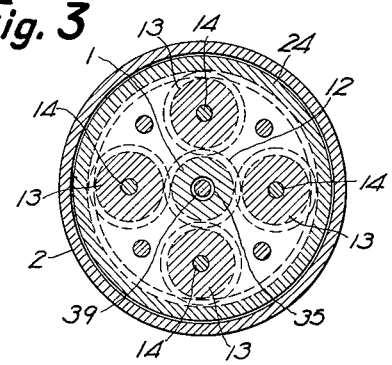
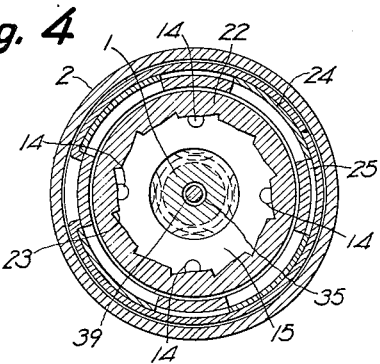
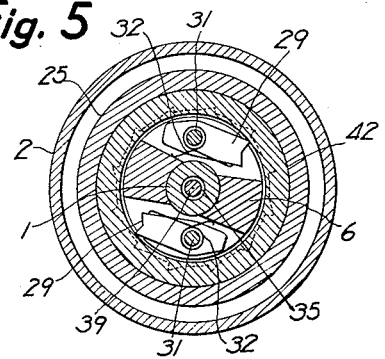

Feb. 20, 1962  KEIZO SHIMANO  3,021,728
THREE STAGE SPEED CHANGE MECHANISM FOR A BICYCLE
Filed July 21, 1959  2 Sheets-Sheet 2

United States Patent Office 3,021,728
Patented Feb. 20, 1962

3,021,728
THREE STAGE SPEED CHANGE MECHANISM
FOR A BICYCLE
Keizo Shimano, 50 Takasago-cho Nicho, Sakai, Japan
Filed July 21, 1959, Ser. No. 828,597
Claims priority, application Japan July 22, 1958
2 Claims. (Cl. 74—750)

This invention relates to a speed change gear for a bicycle, and more particularly a built-in speed change mechanism of the type comprising planetary gears within the rear axle hub of the bicycle. An object of the invention is to provide such speed change gear adapted for smooth changing operation and in which any tendency of breakage is prevented. Another object is to provide a new speed change mechanism which can readily be assembled and is reliable in operation.

The accompanying drawing will serve to illustrate a specific embodiment of the present invention, in order that its utility and functioning will be thoroughly appreciated. It will be understood, however, that this is by way of illustration only and is not to be taken as limiting the invention in any way. In the drawing:

FIGURE 1 is an elevation, partly in longitudinal section, of a rear axle hub of a bicycle equipped with the speed change gear according to this invention, parts being in the position set for low speed drive;

FIGURES 2 through 7 are cross sections taken along lines II, III, IV, V, VI and VII, respectively, of FIGURE 1;

Figure 6:
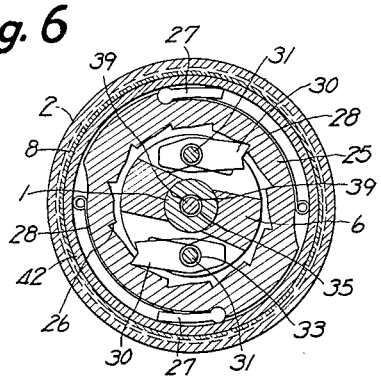

Referring to the drawing, particularly FIGURES 1 to 7, 1 designates a rear wheel axle of a bicycle, on which a hub 2 is journalled. At the right hand end, a duplex ball bearing is provided, which comprises an inner race member 3, balls 4, a driving annular body 6 having fixed thereto a sprocket wheel 5 and forming an outer race for said balls 4 and also forming an inner race for balls 7, and an outer annular body or hub extension 8 forming the outer race for said balls 7. At the left hand end, the hub 2 is journalled through a usual ball bearing comprising an inner race member 9, balls 10, and an outer race member 11 forming an end cover.

Within the hub 2, fixed or formed on the axis 1 is a sun wheel 12 which meshes with a plurality of planetary gears 13 which are axially slidable relative to the sun wheel 12. The planetary gears 13 are rotatably mounted on studs 14 supported by an annular common supporting frame 15, as shown in FIGURES 1 and 3. On the left hand end, the supporting frame 15 has an extension 16 having a first pair of rockable pawls 19 pivoted on axes 18, the free end of each of said pawls 19 being biased outwardly by means of a spring 20. The inner wall of the hub 2 is provided with inner saw-teeth or a first ratchet wheel 21 normally engaged by the free ends of the said first pawls 19, as shown in FIG. 2. On the right hand end of the supporting frame 15, there is united an inner annular body or extension 22 having second internal saw-teeth or a second ratchet wheel 23, which is adapted to partake rotary and sliding movements in unison with the frame 15, as shown in FIG. 4.

Mounted for axial movement in unison with the supporting frame 15, there is an internal ring gear 24 surrounding and meshing with all planetary gears 13, as shown in FIGURE 3. To the right hand end of said internal ring gear 24, there is united an inner gear extension 25 surrounding the said internal annular body 22 and having on the right hand half a third internal sawtooth or a third ratchet wheel 26 which is in line with the second internal ratchet wheel 23 on the annular body 22. Near the right hand end of the ring gear extension 25, on the outer face thereof, there are fourth rockable pawls 27 biased outwardly by means of springs 28, as shown in FIG. 6.

Figure 7:
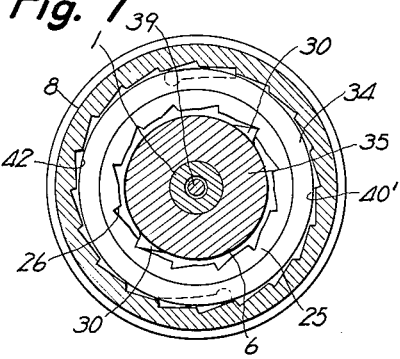

On the left hand end portion of the driving annular body 6, there are rockably mounted second driving pawls 29, 29 and third pawls 30, 30, of which free ends are biased outwardly into engagement with the inner ratchet wheels 23 and 26, respectively, as shown in FIGS. 5 and 6. As shown in FIG. 7, on the inner wall of the hub extension 8, there is formed a fourth internal ratchet wheel 34 which is adapted to be engaged by the above mentioned pawls 27 when the latter are moved rightwardly from the position shown in FIG. 1.

The axle 1 is bored centrally as at 35 for the length substantially same as the whole length of the hub 2, and at the closed end of said bore 35 there is formed a radial slot 36 having longer axial dimension. In said slot a pair of actuating discs 37 and 37' are provided, between which the inner flange 17 on the supporting frame 15 is inserted and embraced thereby. A spiral spring 38 is inserted between the inner race member 9 and the left actuating disc 37, so that the latter is normally pressed rightwardly. Passing through the bore 35, there is a push rod 39, of which the inner end abuts against the right actuating disc 37'. When said push rod 39 is pushed into the innermost position against the action of the spring 38 so that the actuating discs 37 and 37' are moved to the left extreme position, the supporting frame 15 together with the planetary gears 13 and the pawls 19 will be moved to the left position relative to the sun wheel 12 and the first internal ratchet wheel 21, disengaging the pawls 29 and 27 from the second fourth ratchet wheel 23 and the ratchet wheel 34, respectively, and on the other hand, bringing the pawls 30 into engagement with the third internal ratchet wheel 26, as shown in FIGURE 1. This is the position for low speed transmission.

Figure 8:
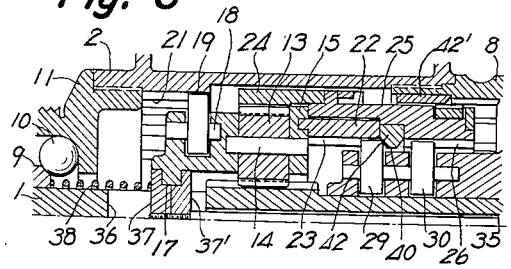
FIGURE 8 is a partial longitudinal section of the mechanism shown in FIG. 1, but as adjusted to the position adapted for intermediate speed drive.

When said push rod 39 is partly retracted or moved rightwardly from the position shown in FIG. 1 to such extent that the actuating discs 37 and 37' are held in the mid-point in the radial slot 36, as shown in FIG. 8, the planetary gears 13 meshing with the sun wheel 12 will be positioned at the mid-position thereof, and the pawls 29 are brought into engagement with the second internal ratchet wheel 23, the internal ring gear 24 being adapted to freely rotate and the third internal ratchet wheel 26 freely slipping over the pawls 30. This is the position for obtaining the intermediate or second speed transmission.

Figure 9:
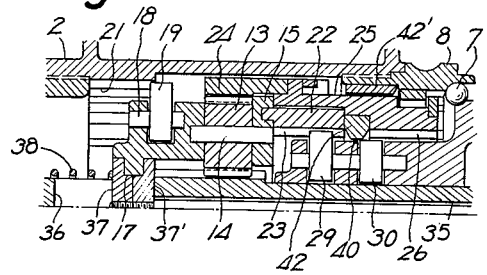
FIGURE 9 is a similar section of the mechanism as adjusted to the position adapted for top speed drive.

When the push rod 39 is held in the further retracted position, i.e. in the position in which the actuating discs 37 and 37' are in the righthand position in the slot 36, as shown in FIG. 9, the pawls 29 and 27 will be brought into engagement with the internal ratchet wheels 23 and 34, respectively, and at the same time the pawls 30 are disengaged from the third internal ratchet wheel 26. This is the position for obtaining the top or third speed transmission.

Figure 10:
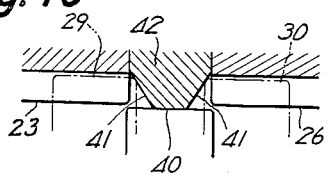
FIGURES 10 and 11 are sectional details showing the pawl and ratchet mechanism.
Figure 11:
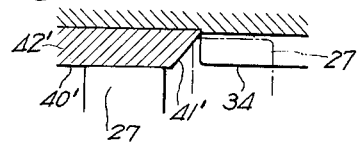

With respect ot the rockable pawls 29, 30 and 27, in order to perform the engagement and disengagement with the internal ratchet wheels 23, 26 and 34, respectively, substantially in alignment, there are provided annular pawl sustainers 42 and 42', respectively, as shown in FIGS. 10 and 11. The pawl sustainer 42 comprises a sustaining face 40 of the diameter slightly smaller than the inner diameter of the tooth tips of the internal ratchet wheels 23 and 26, and a conical guide face 41 beginning with said sustaining face 40 and ending with the teeth bottom line of the edge of the inner saw-teeth of the ratchet wheel. By such arrangement, it is possible to prevent any breakage of the saw-teeth, even where each pawl and saw-teeth are moved independently in the axial direction without maintaining exact alignment, thereby enabling the smooth engagement of the driving pawls and the internal saw-teeth or ratchet wheels.

Figure 12:
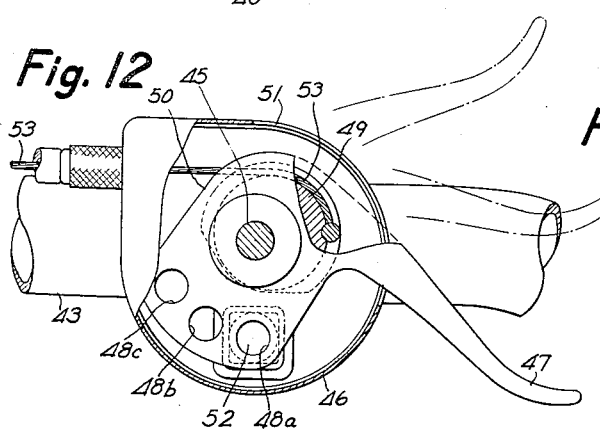
FIGURE 12 is a plan view partly in section of a control lever mechanism mounted on a steering handle.
Figure 13:
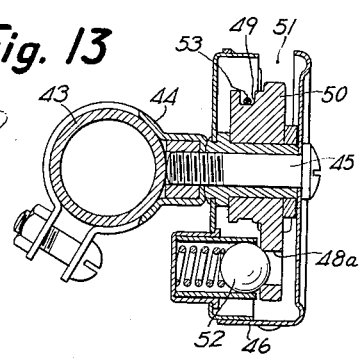
FIGURE 13 is a sectional view thereof.

The axial movement of the push rod 39 for the speed change purpose is effected by means of a suitable control mechanism provided on the steering handle or any convenient part of the bicycle frame. In FIGURES 12 and 13 is illustrated an example of such control mechanism. As shown, securely mounted to the steering handle 43 by means of a clamp 44, there is a casing 46 held by a bolt 45. In said casing 46, there is oscillatably mounted on the bolt 45 a guide block 50 having a peripheral groove 49, and a control lever 47. On the block 50 there are formed three catch holes 48a, 48b and 48c arranged in an arc of a circle having its center in coincidence with the axis of the bolt 45. The control lever 47 extends out of the casing 46 through an opening 51 in the side wall of the casing. Three catch holes 48a, 48b and 48c in the guide block 50 are adapted to co-operate with a spring pressed ball 52, constituting a click stop mechanism, so that the lever 47 may be manually operated and set in either one of the three positions determined by the three catch holes. One end of a Bowden wire 53 is passed along the groove 49 and secured to the block 50 and, extending out of the casing 46, the other end of the Bowden wire is connected to one arm of a bell-crank lever 54 oscillatably mounted on a bracket 55 which is secured to the right hand end of the axle 1. The other arm of the bell-crank lever 54 abuts against the protruded end of the push rod 35 which is normally pressed rightwardly by the action of the spring 38, as shown in FIG. 1.

It is to be understood that it is essential according to the present invention that the mechanism comprises the planetary gear supporting frame 15 axially slidable relative to the sun wheel 12 on the axle 1 and having the annular extension 22 provided with the second ratchet wheel 23, the internal ring gear 24 surrounding said supporting frame and axially slidable in unison with the said supporting frame 15 and having the extension 25 which extends beyond the annular extension 22 and provided with the third internal ratchet wheel 26, and the driving annular body 6 having the sprocket wheel 5 and having the driving pawls 29 and 30 for engagement with said second and third internal ratchet wheels 23 and 26, respectively. By such arrangement according to this invention, in contrast with the existing built-in speed change mechanism of the planetary gear type, the operation of speed change may be more smoothly performed. Moreover, said two pairs of driving pawls being arranged in adjacent positions, the mechanism may be designed in a compact size.

What I claim is:

1. A three stage speed change mechanism with high, low and intermediate stages for a bicycle which comprises: a rear dead axle having a dead end central bore and a radial slot defined adjacent said dead end; a push rod, having oppositely disposed ends, slidably mounted in said central bore with one end inserted therein and the other end extending thereout; a driving annular body, including a sprocket wheel, rotatively mounted on said dead axle; a hub, having two ends, rotatably mounted on said driving annular body and having a first internal ratchet gear defined in one said end; a sun wheel fixed on said axle within said hub; a plurality of planetary gears adapted to axially slide along said sun wheel while meshing therewith; an axially slidable supporting frame for said planetary gears; disc means for operatively engaging the inserted end of said push rod with said axially slidable supporting frame; means operatively engaging the other end of said push rod to axially shift said push rod and engaged frame for changing said stages; an internal ring gear surrounding and meshing with said planetary gears; first driving pawls rockably mounted in one end of said supporting frame and adapted to slidably engage and disengage with said first internal ratchet gear; second and third driving pawls rockably mounted in said driving annular body; a second internal ratchet gear united and extending from the other end of said supporting frame and adapted to slidably engage and disengage with said second driving pawls; a ring gear extension united to said internal ring gear, said ring gear extension forming a third internal ratchet gear in line with said second ratchet gear and adapted to slidably engage and disengage with said third driving pawls; a fourth internal ratchet gear formed on the other end of said hub; and fourth driving pawls rockably mounted in the outer part of said ring gear extension and adapted to slidably engage and disengage with said fourth internal ratchet gear; said driving pawls and associated ratchet gears being arranged whereby when said push rod is farthest advanced in said bore for said first and third driving pawls and ratchet gears to respectively engage said hub and said driving annular body in said low stage, and when said pushrod is farthest retracted out of said bore for said second and fourth driving pawls and ratchet gears to respectively engage said hub and driving annular body in said high stage, and when pushrod is between said advanced and retracted positions, for said first and second driving pawls and ratchet gears to respectively engage said hub and driving annular body in said intermediate stage.

2. A three stage speed change mechanism for a bicycle as recited in claim 1, wherein a pawl sustainer means is provided between the second internal ratchet gear and the third internal ratchet gear for providing smooth engagement of the driving pawls and internal ratchet gears, said sustainer means being provided with a sustaining face of the diameter slightly smaller than the inner diameter of the tooth tips of the internal ratchet gears and a conical guide face beginning with sustaining face and ending with the teeth bottom line of the edge of the inner saw-teeth of the ratchet gear.

References Cited in the file of this patent

UNITED STATES PATENTS

| 832,442 | Archer | Oct. 2, 1906 |
| 2,301,852 | Brown | Nov. 10, 1942 |

FOREIGN PATENTS

| 258,751 | Switzerland | Dec. 15, 1948 |